US008766554B1

(12) United States Patent
Zhang et al.

(10) Patent No.: US 8,766,554 B1
(45) Date of Patent: Jul. 1, 2014

(54) METHOD AND APPARATUS FOR DIMMING

(71) Applicant: Marvell International Ltd., Hamilton (BM)

(72) Inventors: Wanfeng Zhang, Palo Alto, CA (US); Jinho Choi, Saratoga, CA (US); Yangsoo Park, Pleasanton, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/049,769

(22) Filed: Oct. 9, 2013

Related U.S. Application Data

(63) Continuation of application No. 12/954,047, filed on Nov. 24, 2010, now Pat. No. 8,558,474.

(60) Provisional application No. 61/326,710, filed on Apr. 22, 2010, provisional application No. 61/264,603, filed on Nov. 25, 2009.

(51) Int. Cl.
*H05B 37/02* (2006.01)

(52) U.S. Cl.
USPC ........... 315/291; 315/307; 315/274; 315/312; 315/247

(58) Field of Classification Search
USPC ................ 315/274–280, 291, 247, 185 S, 315/307–326, 224, 225, 246
See application file for complete search history.

(56) References Cited

U.S. PATENT DOCUMENTS

| 2007/0290625 | A1 | 12/2007 | He et al. | |
|---|---|---|---|---|
| 2010/0244726 | A1 | 9/2010 | Melanson | |
| 2011/0012530 | A1 | 1/2011 | Zheng et al. | |
| 2011/0037399 | A1* | 2/2011 | Hung et al. | 315/219 |
| 2011/0140620 | A1* | 6/2011 | Lin et al. | 315/224 |
| 2011/0194311 | A1 | 8/2011 | Gaknoki et al. | |
| 2011/0254525 | A1 | 10/2011 | Gaknoki et al. | |

* cited by examiner

*Primary Examiner* — Tuyet Thi Vo

(57) ABSTRACT

Aspects of the disclosure provide a lighting system. The lighting system includes a transformer having a primary winding on a receiving path and a secondary winding on a delivering path. The receiving path receives electric energy regulated based on a dimming angle. The delivering path delivers the received electric energy. According to an aspect of the disclosure, the lighting system includes a secondary switch, and a dimming controller. The secondary switch is switched on to couple a light source, such as an LED array, and the like, with the delivering path to emit light in response to the delivered electric energy and is switched off to decouple the light source from the delivering path. The dimming controller is configured to detect the dimming angle based on an electrical property of the delivering path. Then, the dimming controller switches on and switches off the secondary switch based on the dimming angle.

20 Claims, 5 Drawing Sheets

METHOD AND APPARATUS FOR DIMMING

INCORPORATION BY REFERENCE

This application is a continuation of U.S. application Ser. No. 12/954,047, filed on Nov. 24, 2010, which claims priority under 35 U.S.C. §119(e) to U.S. Provisional Application No. 61/264,603, filed on Nov. 25, 2009, and U.S. Provisional Application No. 61/326,710, filed on Apr. 22, 2010. The disclosures of the applications referenced above are incorporated herein by reference in their entireties.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment in the near future to replace, for example, fluorescent lamps, bulbs, and the like.

SUMMARY

Aspects of the disclosure provide a lighting system. The lighting system includes a transformer having a primary winding on a receiving path and a secondary winding on a delivering path. The receiving path receives electric energy regulated based on a dimming angle. The delivering path delivers the received electric energy. According to an aspect of the disclosure, the lighting system includes a secondary switch, and a dimming controller. The secondary switch is switched on to couple a light source, such as an LED array, and the like, with the delivering path to emit light in response to the delivered electric energy and is switched off to decouple the light source from the delivering path. The dimming controller is configured to detect the dimming angle based on an electrical property of the delivering path. Then, the dimming controller switches on and switches off the secondary switch based on the dimming angle.

Further, the lighting system includes a primary switch that is switched on to enable the receiving path, and is switched off to disable the receiving path and to allow the delivering path to deliver the received electric energy. In addition, the lighting system includes a primary controller configured to generate first pulses and to use the first pulses to switch on and switch off the primary switch.

In an embodiment, the dimming controller is configured to generate second pulses having widths that are modulated based on the dimming angle. The second pulses are used to control the secondary switch. In an example, the dimming controller is configured to modulate the widths of the second pulses according to a sine wave that is regulated based on the dimming angle.

According to an embodiment, the dimming controller includes a low pass filter, a comparator, a counter and a dimming angle determination module. The low pass filter is configured to pass low frequency components of a voltage signal on the secondary winding. The comparator is configured to compare the filtered voltage signal with a reference signal to generate a rectangular shaped signal. The counter is configured to count a number corresponding to a width of the rectangular shaped signal. The dimming angle determination module is configured to determine the dimming angle based on the counted number.

In an example, the light source, such as an LED array, and the like, is packaged in the lighting system. In another example, the light source is separately packaged, and can be installed in the lighting system by a user.

According to another aspect of the disclosure, the dimming controller detects the dimming angle based on a voltage on the receiving path.

Further, according to an embodiment, a part of the functions or all the functions of the dimming controller can be implemented in the primary controller. In an example, the primary controller detects the dimming angle based on the voltage on the receiving path. Further, the primary controller generates the second pulses having the widths that are modulated based on the dimming angle. The second pulses are used to control the secondary switch.

In another embodiment, the primary controller generates the first pulses having widths that are modulated based on the dimming angle. The first pulses are used to control the primary switch. In such embodiment, the lighting system does not need the secondary switch and the dimming controller.

Aspects of the disclosure provide an integrated circuit (IC) to operate with a transformer. The transformer has a primary winding and a secondary winding. The primary winding is on a receiving path to receive electric energy regulated based on a dimming angle. The secondary winding is on a delivering path. According to an aspect of the disclosure, the IC includes a secondary transistor switch, and a dimming controller. The secondary transistor switch is switched on to couple a light source, such as an LED array, and the like, with the delivering path, and is switched off to decouple the light source from the delivering path. The dimming controller is configured to detect the dimming angle based on an electrical property of the delivering path and switch on and switch off the secondary transistor switch based on the detected dimming angle.

Further, the IC includes a primary transistor switch. The primary transistor switch is switched on to enable the receiving path, and is switched off to disable the receiving path and to allow the delivering path to deliver the received electric energy.

The IC also includes a primary switch controller. The primary switch controller is configured to generate first pulses and to use the first pulses to switch on and switch off the primary transistor switch.

In an embodiment, the dimming controller is configured to generate second pulses having widths that are modulated based on the dimming angle. The second pulses are used to control the secondary transistor switch.

Aspects of the disclosure provide a method for driving a lighting device, such as a light emitting diode (LED) lighting device, and the like. The lighting device includes a transformer, a primary switch, a secondary switch, and a light source, such as an LED array, and the like. The transformer has a primary winding on a receiving path and a secondary winding on a delivering path. The method includes repetitively switching on the primary switch to allow the receiving path to receive electric energy regulated based on a dimming angle, and store the received electric energy in the transformer, and repetitively switching off the primary switch to deliver the stored electric energy via the delivering path. Further, the method includes detecting the dimming angle based on an electrical property on the delivering path, and switching on and switching off the secondary switch to couple and decouple the light source based on the detected dimming angle.

To switch on and switch off the secondary switch based on the detected dimming angle, the method includes generating pulses having widths that are modulated based on the dimming angle, and using the pulses to control the secondary switch.

To generate the pulses having the widths that are modulated based on the dimming angle, the method includes modulating the widths of the pulses based on a sine wave that is regulated based on the dimming angle.

To detect the dimming angle based on the electrical property on the delivering path, the method includes filtering a voltage signal on the secondary winding to pass relatively low frequency components, comparing the filtered voltage signal with a reference signal to generate a rectangular shaped signal, measuring a width of the rectangular shaped signal, and determining the dimming angle based on the width of the rectangular shaped signal.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
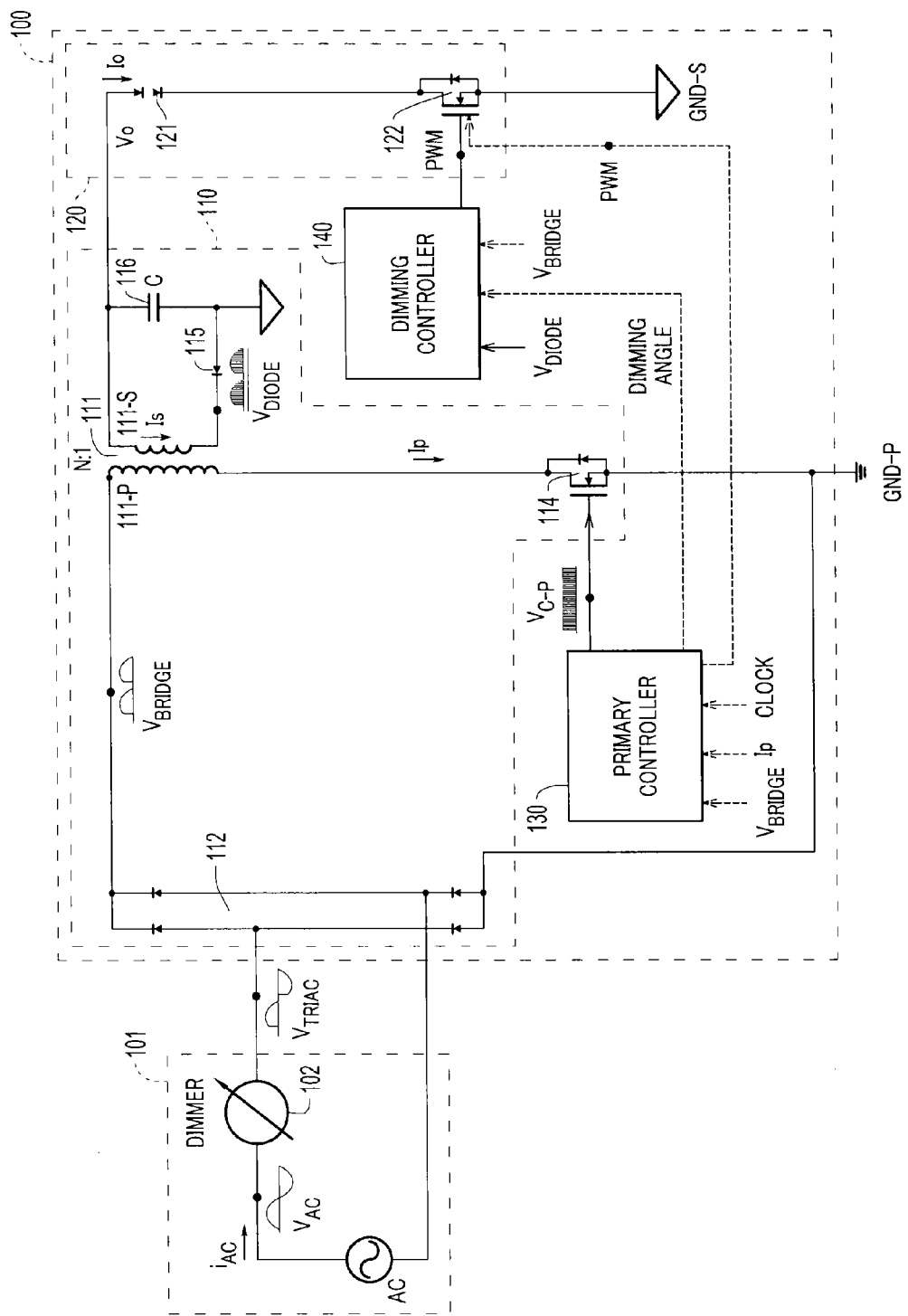
FIG. 1 shows a block diagram of a lighting system example 100 according to an embodiment of the disclosure.

FIG. 1 shows a block diagram of a lighting system example 100 coupled to an energy source 101 according to an embodiment of the disclosure. The lighting system 100 includes a flyback transformer module 110, a light source, such as a light emitting diode (LED) module 120, a primary controller 130, and a dimming controller 140. These elements are coupled together as shown in FIG. 1.

The energy source 101 provides electric energy to the lighting system 100. The energy source 101 can be any suitable energy supply, such as an alternating current (AC) voltage supply, a direct current (DC) voltage supply, and the like. In addition, the energy source 101 includes suitable elements to adjust the provided electric energy. For example, the energy source 101 includes a dimmer 102 to suitably adjust the amount of electric energy provided to the lighting system 100.

In an embodiment, the dimmer 102 is a phase angle based dimmer. In an example, the energy source 101 is an AC voltage supply having a sine wave shape, and the dimmer 102 is a forward-type triode for alternating current (TRIAC) dimmer 102 having an adjustable dimming angle $\alpha$ within $[0, \pi]$. Every time the AC voltage $V_{AC}$ crosses zero, the forward-type TRIAC dimmer 102 stops firing charges for a dimming angle $\alpha$. Thus, in each cycle $[0, 2\pi]$, when the phase of the AC voltage $V_{AC}$ is within $[0, \alpha]$ or $[\pi, \pi+\alpha]$, the TRIAC voltage $V_{TRIAC}$ output from the forward-type TRIAC dimmer 102 is zero; and when the phase of the AC voltage $V_{AC}$ is within $[\alpha, \pi]$ or $[\pi+\alpha, 2\pi]$, the TRIAC voltage $V_{TRIAC}$ follows the AC voltage $V_{AC}$. Generally, $[0, \alpha]$ and $[\pi, \pi+\alpha]$ are referred to as non-conduction angle. Similarly, $[\alpha, \pi]$ and $[\pi+\alpha, 2\pi]$ are referred to as conduction angle.

The flyback transformer module 110 receives electric energy from the energy source 101, stores the electric energy, and provides the stored electric energy to the LED module 120. The flyback transformer module 110 includes components to suitably process the input from the energy source 101. In the FIG. 1 example, the flyback transformer module 110 includes a transformer 111, a bridge rectifier 112, a primary switch 114, a rectifier diode 115, and a smooth capacitor 116. These elements are coupled together as shown in FIG. 1.

The transformer 111 includes a primary winding 111-P and a secondary winding 111-S. The primary winding 111-P and elements that are electrically coupled to the primary winding 111-P are referred to as a primary side of the flyback transformer module 110. Similarly, the secondary winding 111-S and the elements that are electrically coupled to the secondary winding 111-S are referred to as a secondary side of the flyback transformer module 110. On the primary side, the bridge rectifier 112, the primary winding 111-P and the primary switch 114 are coupled together to form a receiving path to receive the electric energy. On the secondary side, the secondary winding 111-S, the rectifier diode 115 and the smooth capacitor 116 are coupled together to form a delivering path to deliver the received electric energy to a load, such as the LED module 120.

It is noted that the flyback transformer module 110 can be configured in an isolated configuration or a non-isolated configuration. In an example, a terminal of the primary side (i.e., a terminal of the primary switch 114) is connected to a primary ground GND-P, and a terminal of the secondary side (i.e., a terminal of the rectifier diode 115) is connected to a secondary ground GND-S. When the primary ground GND-P and the secondary ground GND-S are the same ground, the flyback transformer module 110 is in the non-isolated configuration; but when the primary ground GND-P and the secondary ground GND-S are not the same ground, the flyback transformer module 110 is in the isolated configuration. When the flyback transformer module 110 is in the isolated configuration, the lighting system 100 includes suitable isolation block (not shown) to provide galvanic isolation between the primary side and the secondary side.

The bridge rectifier 112 rectifies the received AC voltage to a fixed polarity, such as to be positive. The primary switch 114 switches on and switches off the receiving path.

Further, the transformer 111, the rectifier diode 115, and the primary switch 114 are configured to enable a flyback transformer operation. More specifically, when the primary switch 114 is switched on and the phase of the AC voltage supply is within the conduction angle, the receiving path receives electric energy. From the energy source 101, a primary switch current Ip flows through the dimmer 102, the bridge rectifier 112, the primary winding 111-P of the transformer 111, and the primary switch 114. The polarity of the transformer 111 and the direction of the rectifier diode 115 are suitably arranged, such that there is no current in the secondary winding 111-S of the transformer 111 when the primary switch 114 is switched on. Thus, the received electric energy is stored in the transformer 111.

When the primary switch 114 is switched off, the receiving path is cut off. Thus, the primary switch current Ip becomes zero. The polarity of the transformer 111 and the direction of the rectifier diode 115 enable the delivering path to deliver the stored electric energy to the LED module 120.

According to an embodiment of the disclosure, the primary switch 114 is repetitively switched on and off. Thus, the receiving path repetitively receives the electric energy and stores the electric energy in the transformer 111. Then, the delivering path repetitively delivers the stored electric energy to the LED module 120.

The smooth capacitor 116 smoothes the current Io provided to the LED module 120. In an embodiment, the smooth capacitor 116 has a relatively large capacitance.

The primary controller 130 generates pulses to control the primary switch 114. According to an aspect of the disclosure, the pulses have a relatively high frequency, such as 100 KHz. The relatively high frequency enables power factor correction (PFC) for the AC voltage supply. Specifically, each time, the primary controller 130 switches on and switches off the primary switch 114, the primary switch current Ip has a spike. The peak value of the spike is a function of the AC voltage supply during the switch-on time. Thus, an average of the primary switch current Ip has substantially the same phase as the AC voltage supply.

According to another aspect of the disclosure, the primary controller 130 receives various signals from other components of the lighting system 100. The various signals indicate states, status, or performance of the other components. The primary controller 130 adjusts pulse attributes, such as frequency, duty ratio, width, and the like based on the various signals. The pulses are used to control the primary switch 114. In an example, the primary controller 130 receives a signal that is indicative of a bridge voltage $V_{BRIDGE}$ output from the bridge rectifier 112. In another example, the primary controller 130 receives a signal that is indicative of the primary switch current Ip.

It is noted that the primary controller 130 also receives external signals, for example, from a user, or from another device. Then, the primary controller 130 adjusts the pulse attributes based on the received external signals. The pulses are used to control the primary switch 114.

The LED module 120 includes an LED array 121 and a secondary switch 122. The secondary switch 122 is switched on and switched off to couple or decouple the LED array 121 with the delivering path. When the LED array 121 is coupled to the delivering path, the LED array 121 conducts current and emits light. The light intensity corresponds to the current flowing through the LED array 121.

The dimming controller 140 detects the dimming angle, and generates pulses with width modulated based on the dimming angle. Thus, an average duty cycle of the pulses is a function of the dimming angle. When the width-modulated pulses are used to control the secondary switch 122, an average current flowing through the LED array 121 is a function of the dimming angle, and then an average intensity of light emitted by the LED array 121 is a function of the dimming angle.

The dimming controller 140 can use any suitable pulse width modulation (PWM) technique to generate the width-modulated pulses based on the dimming angle. In an example, the dimming controller 140 generates a pulse train having a relatively high frequency, such as 100 KHz, and the like. Then, the dimming controller 140 modulates the pulse width of the pulse train based on a sine wave that is regulated by the dimming angle. The sine wave has a relatively low frequency, such as 1 KHz, and the like.

The dimming controller 140 uses any suitable technique to detect the dimming angle. In an embodiment, the dimming controller 140 detects the dimming angle based on a voltage at the secondary side of the flyback transformer module 110, such as a voltage $V_{DIODE}$ on the secondary winding 111-S.

The peak value or envelope of the voltage $V_{DIODE}$ follows the shape of the bridge voltage $V_{BRIDGE}$. In this embodiment, communication between the primary side and the secondary side is not required. The flyback transformer module 110 can be configured in the isolated configuration or in the non-isolated configuration.

In another embodiment, communication between the primary side and the secondary side is required. In an example, the dimming controller 140 detects the dimming angle from a voltage on the primary side, such as the bridge voltage $V_{BRIDGE}$ output from the bridge rectifier 112. In another example, the primary controller 130 detects the dimming angle from the bridge voltage $V_{BRIDGE}$, and informs the dimming controller 140 the detected dimming angle.

It is noted that functions of the dimming controller 140 can be suitably combined into the primary controller 130. For example, the primary controller 130 detects the dimming angle from the bridge voltage $V_{BRIDGE}$, and generates pulses with width modulated based on the dimming angle. The pulses are then used to control the secondary switch 122.

When the flyback transformer module 110 is configured in the non-isolated configuration, signals can be transmitted between the primary side and the secondary side using wires. However, when the flyback transformer module 110 is configured in the isolated configuration, the transformer module 110 includes an isolation block (not shown) to provide galvanic isolation between the primary side and the secondary side, thereby protecting the components in the lighting system 100. To transmit signals between the primary side and the secondary side, the isolation block includes suitable coupler circuit, such as opto-coupler, inductor coupler, capacitor coupler, and the like. The coupler circuit occupies additional space, and adds additional cost to the lighting system 100.

It is noted that the transformer 111 can include additional secondary windings (not shown). The additional secondary windings can be similarly configured as the secondary winding 111-S to drive additional LED modules.

It should be understood that the receiving path and the driving path can include additional components, such as resistors, additional switches, and the like. In an example, the lighting system 100 can include a bleeding path having a bleeding resistor (not shown) and a switch (not shown). The bleeding path can be suitably switched on to leak current.

It is noted that the lighting system 100 can be implemented by various techniques. According to an aspect of the disclosure, the lighting system 100 is implemented as a single package to replace an incandescent light bulb, for example. According to another aspect of the disclosure, the LED array 121 is separately implemented and packaged for sale. A user can buy a new LED array, and can install the new LED array in the lighting system 100 or replace an existing LED array in the lighting system 100.

In addition, the circuit in the lighting system 100 can be implemented by an integrated circuit and/or discrete components. In an embodiment, the primary switch 114 and the secondary switch 122 are implemented using transistors, and a process for manufacturing the transistors is compatible with the manufacturing process for the primary controller 130 and the dimming controller 140. Then, the primary controller 130, the dimming controller 140, the primary switch 114 and the secondary switch 122 are integrated on a single integrated circuit (IC) chip. In another embodiment, the primary controller 130 and the primary switch 114 are integrated on a first IC chip and the dimming controller 140 and the secondary switch 122 are integrated on a second IC chip. In another embodiment, the primary switch 114 is implemented as a discrete component that is coupled with an IC chip that performs the controller functions.

Figure 2:
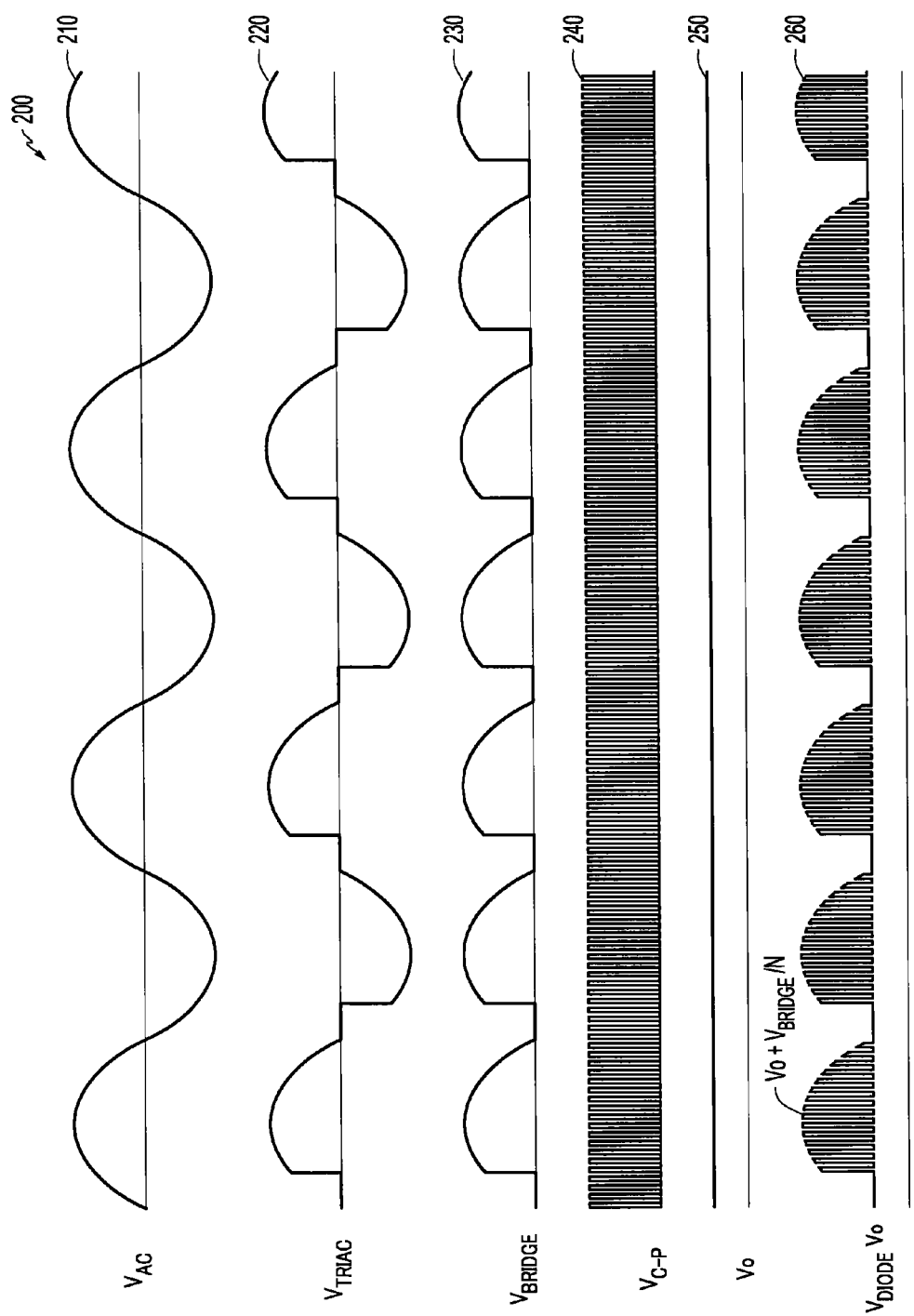
FIG. 2 shows a plot of waveform examples in the lighting system 100 according to an embodiment of the disclosure.

FIG. 2 shows a plot 200 of waveform examples in the lighting system 100 according to an embodiment of the disclosure. The plot 200 includes waveforms 210-260. The waveform 210 tracks the AC voltage $V_{AC}$ from the AC voltage supply. The waveform 220 tracks the TRIAC voltage $V_{TRIAC}$ output from the forward-type TRIAC dimmer 102. The waveform 230 tracks the bridge voltage $V_{BRIDGE}$ output from the bridge rectifier 112. The waveform 240 tracks the pulse signal $V_{C-P}$ generated by the primary controller 130 to control the primary switch 114. The waveform 250 tracks output voltage V0 by the flyback transformer module 110. The waveform 260 tracks the voltage $V_{DIODE}$ on the secondary winding 111-S.

For ease and clarity, the amplitudes and frequencies of the waveforms 210-260 are not drawn to scale.

It is noted that the envelope of the voltage $V_{DIODE}$ on the secondary winding 111-S follows the shape of the bridge voltage $V_{BRIDGE}$ with scaling and shifting. For example, the envelope of the voltage $V_{DIODE}$ is equivalent to the bridge voltage $V_{BRIDGE}$ being scaled by 1/N (N is the winding ratio of the primary winding 111-P to the secondary winding 111-S), and being shifted by Vo. Thus, when the dimming angle α of the forward-type TRIAC dimmer 102 is adjusted, the envelope of the voltage $V_{DIODE}$ changes. By detecting the envelope of the voltage $V_{DIODE}$, the dimming angle α can be detected. The dimming controller 140 uses any suitable detection techniques to detect the dimming angle, and modulates widths of the pulses for controlling the secondary switch 122 based on the detected dimming angle.

Figure 3:
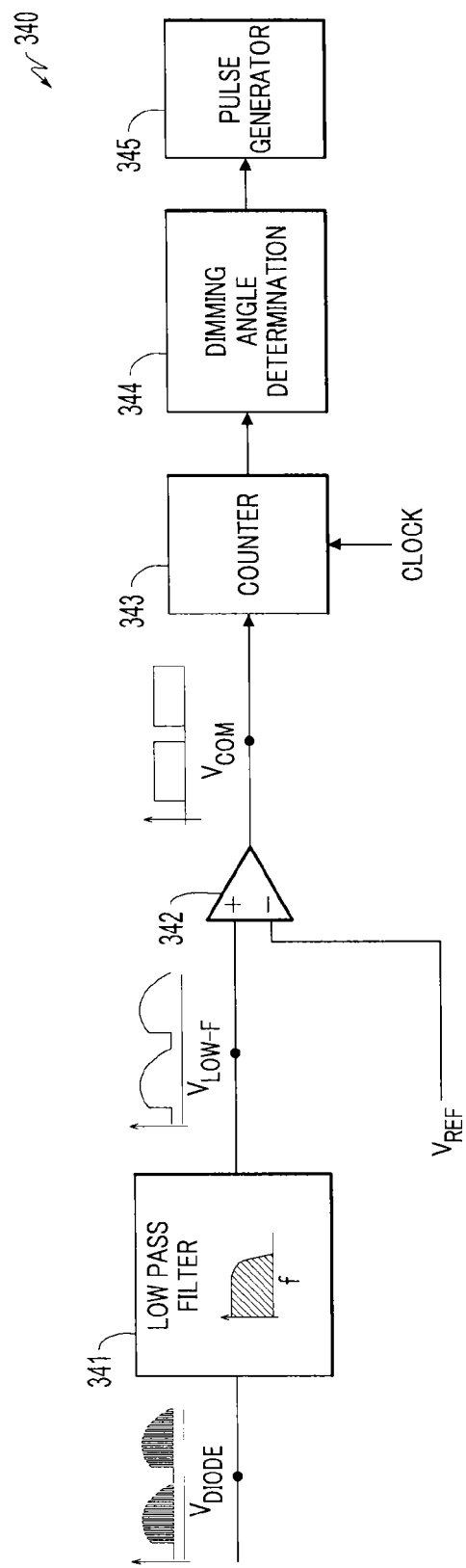
FIG. 3 shows a block diagram of a dimming controller 340 according to an embodiment of the disclosure.

FIG. 3 shows a block diagram of a dimming controller 340 according to an embodiment of the disclosure. The dimming controller 340 includes a low pass filter 341, a comparator 342, a counter 343, a dimming angle determination module 344, and a pulse generator 345. These elements are coupled together as shown in FIG. 3.

The low pass filter 341 receives the voltage $V_{DIODE}$ on the secondary winding 111-S, and obtains the relatively low frequency components in the voltage $V_{DIODE}$. Specifically, the voltage $V_{DIODE}$ has relatively high frequency components corresponding to the switching of the primary switch 114, and has relatively low frequency components corresponding to the shape of the bridge voltage $V_{BRIDGE}$. In an example, the AC voltage supply has a frequency of 60 Hz, thus the bridge voltage $V_{BRIDGE}$ has a frequency of 120 Hz. The switching frequency of the primary switch 114 is relatively high, such as 100 KHz, for example. The low pass filter 341 is designed to have a cut-off frequency of 20 KHz, for example. Thus, the filtered signal has relatively the same shape as the bridge voltage $V_{BRIDGE}$.

The comparator 342 compares the filtered signal with a reference signal, such as a reference voltage signal $V_{REF}$. In an example, the reference signal is equivalent to or a little bit larger than Vo. The comparator 342 outputs "1" (e.g., a relatively high voltage) when the filtered signal is larger than the reference signal, and outputs "0" (e.g. a relatively low voltage) when the filtered signal is lower than the reference signal. Thus, the comparator 342 outputs a rectangular shaped signal, and the width of the rectangular shaped signal is a function of the dimming angle.

The counter 343 measures the pulse width of the rectangular shaped signal. In an example, counter 343 receives a clock signal having a relatively high frequency, and counts clock cycles of the clock signal. The counter 343 resets, starts counting in response to a leading edge of the rectangular shaped signal, and stops counting in response to a trailing edge of the rectangular shaped signal.

The dimming angle determination module 344 receives the counted number and determines the dimming angle based on the counted number. In an example, when the clock signal have a frequency of 12 KHz, and the counted number is 50, the dimming angle is π/2.

The pulse generator 345 generates pulses with width modulated based on the dimming angle. In an example, the pulse generator 345 generates a pulse train having a frequency of 100 KHz. Further, the pulse generator 345 modulates the pulse width of the pulse train based on a sine wave having a frequency of 1 KHz. The sine wave has been regulated based on the dimming angle. The width-modulated pulses are used to control the secondary switch 122.

Figure 4:
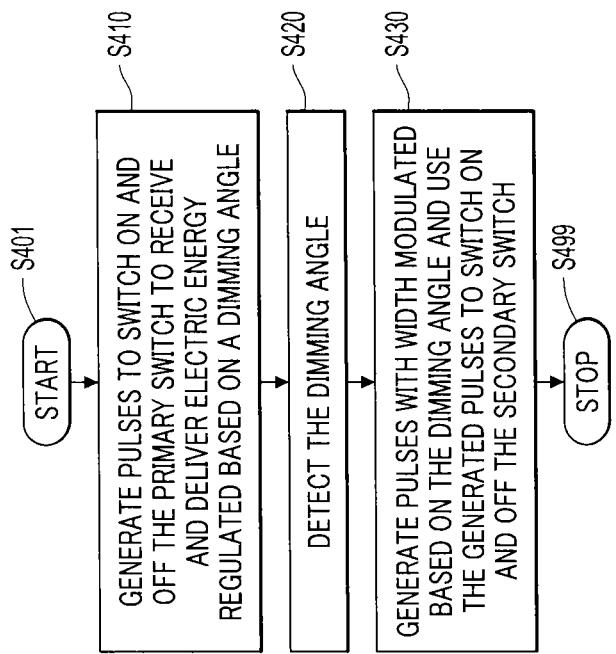
FIG. 4 shows a flowchart outlining a process example 400 for dimming control in the lighting system 100 according to an embodiment of the disclosure.

FIG. 4 shows a flowchart outlining a process example 400 for dimming control in the lighting system 100 according to an embodiment of the disclosure. The process starts at S401 and proceeds to S410.

At S410, pulses are generated by the primary controller 130, and are used to control the primary switch 114. The primary switch 114 is switched on to couple the receiving path at the primary side to the energy source 101 to receive electric energy that is regulated based on the dimming angle and to store the received electric energy in the transformer 111. The primary switch 114 is switched off to cut off the receiving path and to allow the delivering path on the secondary side to deliver the electric energy to the LED array 121.

At S420, the dimming angle is detected. In an embodiment, the dimming angle is detected by the dimming controller 140 based on a voltage on the secondary winding 111-S of the transformer 111. Thus, communication between the primary side and secondary side of the flyback transformer module 110 is not needed. In another embodiment, communication between the primary side and the secondary side of the flyback transformer module 110 is needed. In an example, the dimming angle is detected by the dimming controller 140 based on a voltage from the primary side of the flyback transformer module 110. In another example, the dimming angle is detected by the primary controller 130 based on a voltage on the primary side of the flyback transformer module 110. The detected dimming angle is transmitted to the dimming controller 140.

At S430, width-modulated pulses are generated based on the dimming angle. The width-modulated pulses are used to switch on and switch off the secondary switch 122 in order to control the intensity of light emitted by the LED array 121. In an embodiment, the pulses are generated by the dimming controller 140 based on the dimming angle. For example, the dimming controller 140 generates a pulse train having a frequency of 100 KHz. Further, the dimming controller 140 modulates the pulse width of the pulse train based on a sine wave having a frequency of 1 KHz. The sine wave has been regulated based on the dimming angle.

In another embodiment, the pulses are generated by the primary controller 130, and are transmitted to the secondary side to control the secondary switch 122. Then, the process proceeds to S499 and terminates.

It is noted that when the communication between the primary side and the secondary side of the flyback transformer module 110 is not needed or the lighting system 100 is in the non-isolated configuration, coupler component, such as optocoupler, inductor coupler, capacitor coupler, and the like are not needed. However, when communication between the primary side and the secondary side of the flyback transformer module 110 is needed and the lighting system 100 is in the isolated configuration, coupler components are needed for the communication. The coupler devices add additional cost and size to the lighting system 100.

Figure 5:
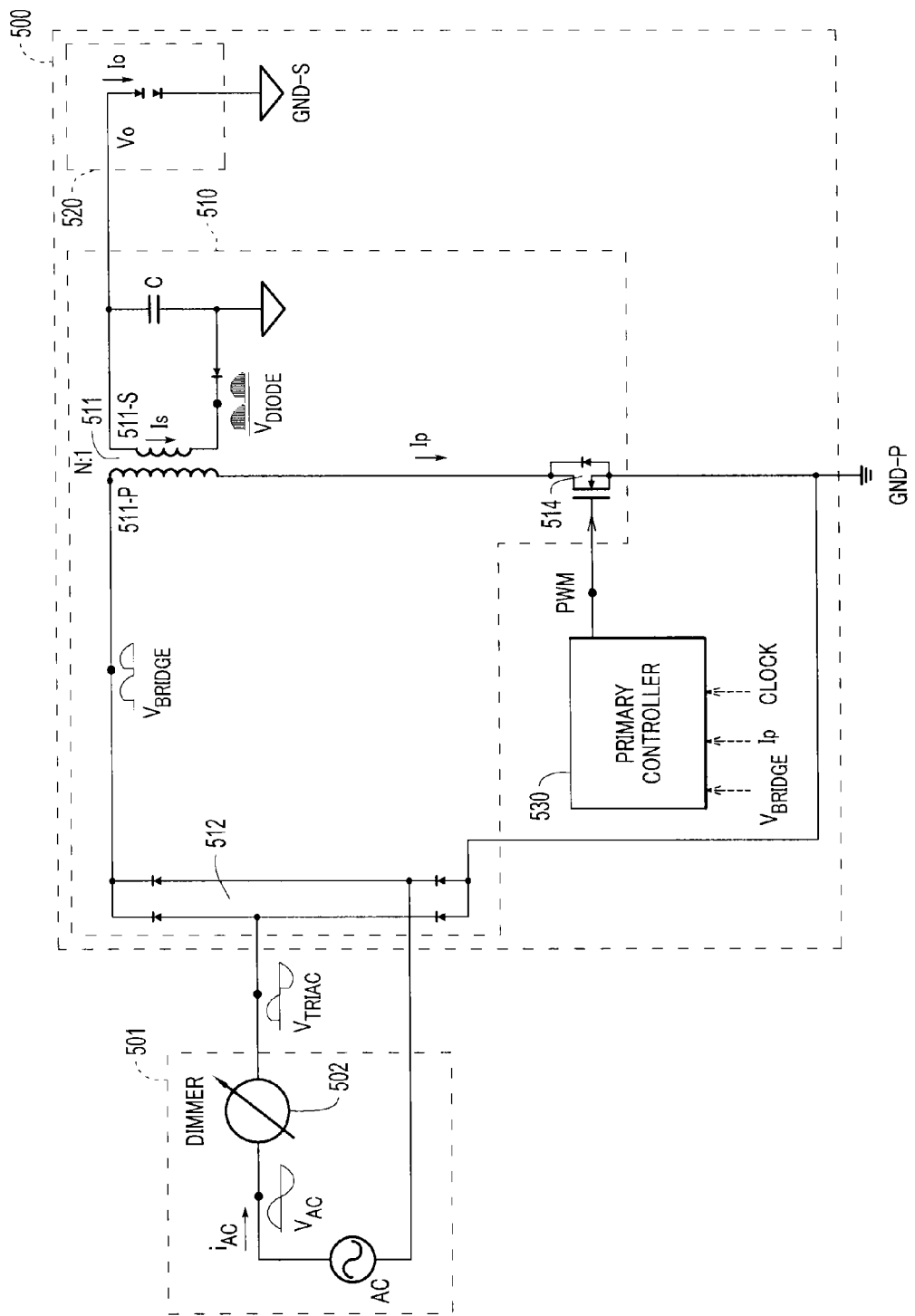
FIG. 5 shows a block diagram of another lighting system example 500 coupled to an energy source 501 according to an embodiment of the disclosure.

FIG. 5 shows a block diagram of a lighting system example 500 coupled to an energy source 501 according to an embodiment of the disclosure. The lighting system 500 also utilizes certain components that are identical or equivalent to those used in the lighting system 100; the description of these components has been provided above and will be omitted here for clarity purposes. However, in this embodiment, the lighting system 500 is structurally different in a number of respects.

The secondary side of the transformer module 510 does not include a secondary switch and a dimming controller. The primary controller 530 detects the dimming angle based on a voltage at the primary side. In addition, the primary controller 530 generates pulses with width modulated based on the dimming angle. In an example, the primary controller 530 generates a pulse train having a frequency of 100 KHz. Further, the primary controller 530 modulates the pulse width of the pulse train based on a sine wave having a frequency of 1 KHz. The sine wave has been regulated by the dimming angle. The width-modulated pulses are used to control the primary switch 514. Thus, the average amount of received and delivered electric energy by the transformer module 510 is a function of the dimming angle. When the electric energy is delivered to the LED array 520, the intensity of light emitted by the LED array 520 is a function of the dimming angle.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A lighting system, comprising:
    a switch configured to be switched on to couple a light source with a delivering path to emit light in response to electric energy delivered to a receiving path and switched off to decouple the light source from the delivering path, the receiving path receiving the electric energy regulated based on a dimming angle; and
    a controller configured to detect the dimming angle, and switch on and switch off the switch based on the dimming angle, the controller further configured to measure a width of a signal that is a function of the dimming angle, the signal being generated based on a voltage signal on the delivering path.

2. The lighting system of claim 1, further comprising:
    a transformer having a primary winding on the receiving path and a secondary winding on the delivering path, the transformer configure to receive, store, and provide the electric energy to the light source.

3. The lighting system of claim 1, wherein the controller uses a counter to measure the width of the signal having a rectangular shape.

4. The lighting system of claim 1, wherein the electric energy is regulated by a triode for alternating current (TRIAC) dimmer.

5. The lighting system of claim 1, further comprising:
    a primary switch configured to be switched on to enable the receiving path, and switched off to disable the receiving path and to allow the delivering path to deliver the electric energy.

6. The lighting system of claim 5, further comprising:
    a primary controller configured to generate pulses and use the pulses to switch on and switch off the primary switch.

7. The lighting system of claim 1, wherein the controller is further configured to generate pulses having widths based on the dimming angle, the pulses being used to control the switch.

8. The lighting system of claim 7, wherein the controller is further configured to modulate the widths according to a sine wave that is regulated based on the dimming angle.

9. The lighting system of claim 1, wherein the controller further comprises:
    a filter configured to pass low frequency components of the voltage signal on a winding on the delivering path;
    a comparator configured to compare the passed low frequency components of the voltage signal with a reference signal to generate the signal;
    a counter configured to count a number corresponding to the width of the signal; and
    a dimming angle determination module configured to determine the dimming angle based on the counted number.

10. The lighting system of claim 1, wherein the light source is a light emitting diode (LED) array, the switch is switched on to couple the LED array with the delivering path to emit light in response to the delivered electric energy and is switched off to decouple the LED array from the delivering path.

11. A method, comprising:
    switching on a switch to couple a light source with a delivering path to emit light in response to electric energy delivered to a receiving path;
    receiving the electric energy regulated based on a dimming angle by the receiving path;
    switching off the switch to decouple the light source from the delivering path;
    detecting, by a controller, the dimming angle, and switching on and switching off the switch based on the dimming angle;
    generating a signal based on a voltage signal on the delivering path; and
    measuring a width of the signal that is a function of the dimming angle.

12. The method of claim 11, further comprising:
    receiving, storing, and providing the electric energy to the light source by a transformer having a primary winding on the receiving path and a secondary winding on the delivering path.

13. The method of claim 11, wherein measuring the width comprises counting a number corresponding to the width of the signal having a rectangular shape by a counter.

14. The method of claim 11, further comprising:
    regulating the electric energy by a triode for alternating current (TRIAC) dimmer.

15. The method of claim 11, further comprising:
    switching on a primary switch to enable the receiving path; and
    switching off the primary switch to disable the receiving path and to allow the delivering path to deliver the electric energy.

16. The method of claim 15, further comprising:
    generating pulses and using the pulses to switch on and switch off the primary switch.

17. The method of claim 11, further comprising:
    generating pulses having widths based on the dimming angle; and
    using the pulses to control the switch.

18. The method of claim 17, wherein generating the pulses comprises modulating the widths according to a sine wave that is regulated based on the dimming angle.

19. The method of claim 11, further comprising:
- filtering the voltage signal to pass low frequency components of the voltage signal on a winding on the delivering path;
- comparing the passed low frequency components of the voltage signal with a reference signal to generate the signal;
- counting a number corresponding to the width of the signal; and
- determining the dimming angle based on the counted number.

20. The method of claim 11, wherein the light source is a light emitting diode (LED) array, switching on the switch couples the LED array with the delivering path to emit light in response to the delivered electric energy and switching off the switch decouples the LED array from the delivering path.

* * * * *